United States Patent Office 3,594,341
Patented July 20, 1971

3,594,341
TREATING OF AGGLOMERATES OF CELLULOSE PARTICLES AND FIBRES
Hynek Bata, 25 Rue Saint-Didier, Paris, 6 eme, France; Pierre Bernard, 5 Parc de l'Iton; and Bernard Costemalle, Tour n°3, Place Colbert, both of Mont-Saint-Aignan, Seine-Maritime, France; and Robert Michelet, 6 Square de Versailles, Les Grandes Terres, Marly-le-Roi, Seine-et-Oise, France
No Drawing. Filed Aug. 16, 1966, Ser. No. 572,669
Int. Cl. C08g 51/52; C08f 45/52
U.S. Cl. 260—28                               3 Claims

ABSTRACT OF THE DISCLOSURE

An aqueous emulsion of a mixture of paraffin and a petroleum resin, to which a resin adhesive is added, is useful for treating agglomerates such as cellulose fibres or wood particles to form products such as chip boards and fibre boards.

---

The present invention is concerned with a new process for treating agglomerates of cellulose fibres such as chip boards and fibre boards. Among other advantages, the invention provides an economical way to waterproof, harden and improve the surface appearance of such agglomerates.

It is well known to waterproof cellulose agglomerates by treating them with paraffin emulsions or by spraying petroleum resin emulsions on their surface. As a rule, these treatments have the drawback of lessening the bending strength of the agglomerates. Moreover, the surface often remains rough and lacks gloss; it absorbs large quantities of pain if it is desired to improve its appearance by coating.

The use of purified paraffins as waterproofing agents gives good results but is costly. Crude paraffin obtained in refineries in the purification of oils and known in the trade by the name of "slack wax" would have the advantage of being extremely economical, but experience has shown that its incorporation impairs the characteristics of the agglomerates as regards the absorption of water and swelling, as well as the resistance to trickling or bending.

We have discovered that it is possible to improve the characteristics of agglomerates of cellulose particles and fibres by an economical process employing an emulsion of paraffin and petroleum resin, said emulsion being applied by means of an internal and/or a surface treatment. The emulsion may be formed from a pure or crude paraffin.

As the petroleum resin, it is advisable to use the thermoplastic resins obtained by polymerisation, in the presence of a Friedel-Crafts catalyst, of steam cracked petroleum distillates; the charge to be polymerised may consist of a mixture of olefins and diolefins, the latter being present in sufficient quantity to obtain a resin and not an oil or a rubbery material. These resins are polydienic in character; their softening point is between 50 and 180° approximately. Details as to the preparation of suitable petroleum resins can be found in the literature including U.S. Pat. 2,754,288.

The crude paraffin or "slack wax" is obtained in the course of the purification of petroleum oils, by filtration of paraffin distillates or by their treatment with solvents.

In carrying out the invention there is prepared a mixture containing 1 to 99% by weight of crude paraffin and 99 to 1% by weight of petroleum resin. It is advantageous to use at least 15% by weight of crude paraffin and as much petroleum resin as there is oil in the crude paraffin.

This mixture is emulsified with an anionic, cationic, nonionic or ampholytic emulsifier.

Among the anionic emulsifiers there may be mentioned: the salts of an alkali metal and a fatty acid or a mixture of fatty acids or other acids such as resinic, naphthenic acids, etc. sulphated or sulphonated compounds, such as: alkali salts of sulphonated paraffins or acid sulphates of fatty alcohols, so-called sulphonated oils, alkyl-aryl sulphonates, etc.

Cationic emulsifiers that may be used include the salts or mixtures of salts: of a mineral or organic acid soluble in water and of a phosphine or a nitrogen base, such as amine, polyamine, quaternary ammonium base etc.

Among the non-ionic emulsifiers there may be cited: compounds or mixtures of compounds obtained by polycondensation of ethylene oxide or propylene oxide with fatty alcohols, fatty acids or alkylphenols, amides derived from alkylolamines, etc.

Among the ampholytic emulsifiers we may mention: sterols, lanoline, phospho-lipids, proteins, bentonine, etc., or mixtures of these substances.

Emulsification in water can be carried out by the direct process (addition of paraffin and resin to water plus emulsifier), by the inverse process (addition of water to emulsifier-containing paraffin/resin mixture) or by the nascent soap process. In the latter case, the lipophilic portion of the emulsifier is dissolved in the mixture of resin and paraffin while the hydrophilic part of the emulsifier is dissolved in water, then these two solutions are mixed with stirring.

These operations are advantageously performed at a temperature between 30° and 100° C.

The quantity of emulsifier to be used varies from 0.1 to 10% by weight, based on the weight of the emulsion, and is preferably within the range of 1 to 5%.

The quantity of dry extract can vary from 20 to 80% by weight of the emulsion and preferably from 40 to 60%.

It is of course possible to prepare emulsions similar to the foregoing ones from more or less purified paraffins, in particular, from white paraffins, whose melting point is in the region of 40° to 80° C.

In the process of the invention, the above-described emulsions are used to perform the conventional internal treatment of the agglomerates and/or a special surface treatment.

Both the internal treatment and the surface treatment involve the conventional adhesives, i.e. thermo-setting resins, including the following:

(1) The aminoplastics obtained by condensation of an amine or a mixture of amines, preferably polyamines such as hexamethylene tetramine, tetraethylene pentamine, and even better, diamines such as hexamethylene diamine, paraphenylene diamine and/or amides or compounds that can be connected with the amine function, such as urea, melamine (cyanuramide), thiourea etc. with either an aldehyde or a phenolic compound, such as a phenol, a polyphenol, an alkyl phenol substituted or not, a halogenated derivative of the aforementioned compound, or an aldehyde and a phenolic compound.

(2) The formophenolic resins obtained by polycondensation of an aldehyde such as formaldehyde, furfurol, etc. with a phenolic compound as listed above; and (3) A mixture of several of the said resins.

In general, hardeners such as ammonium salts are added to these adhesives.

In carrying out the internal treatment, the emulsion of the petroleum resin paraffin mixture is added to the adhesive mixture (thermosetting resin-hardener) and the whole is mixed then this mixture is sprayed, after homogenising, onto the fibres or particles (chips). The glue, in the dry state, constitutes generally 6 to 14% and preferably 8 to 10% of the weight of the finished agglomerate. The quantity of emulsion is calculated so that the petroleum resin and the paraffin represent in the dry state 0.3 to 5%, and preferably 0.5 to 3% of the weight of the finished agglomerate.

After the agglomerate has been given its final shape a mixture of emulsion and adhesive plus hardener is sprayed onto the entire exterior surface of the article to perform the surface treatment according to the invention. In this mixture, the relative proportions of emulsion and adhesive may be varied, but preferably their ratio is close to 1 in the dry state. The quantity of the mixture to be applied is calculated so as to make up preferably 2 to 4% in the dry state of the weight of the finished agglomerate.

The process of the invention results in agglomerates having interesting properties, including excellent resistance to water penetration and swelling, good resistance to bending, and a clean, smooth surface, which can be painted easily.

A great variety of cellulose fibre and particle agglomerates will benefit from the invention but it is apparent that the present paraffin-petroleum resin emulsions are particularly useful in the treatment of chip boards and fibre boards to protect them against water and to improve their surface appearance.

The following example, which is given by way of illustration, demonstrates the significance and the advantages of the invention.

EXAMPLE

In the test boards made of hardwood particles, 3 mm. thick and of a density of 0.650, were treated. The agglomerates were made under the following conditions:

Pressing: 25/30 kg./sq. cm.
Temperature: 150° C. for 80 seconds.
Stoving: 180° C. for 45 to 50 seconds.

Adhesive used: commercial urea-formol resin with hardener based on $ClNH_4$. Quantity of adhesive used: 8–10% by weight in the dry state, based on the weight of the finished board. Paraffin or paraffin/petroleum resin emulsion (see below): 1–3% by weight (dry), based on the weight of the finished board.

A petroleum resin was used obtained by polymerisation at 40° C. in the presence of 1% aluminum chloride, of fractions derived from the steam cracking of petroleum distillates. This petroleum resin had the following characteristics:

Molecular weight: 1400
Ball-ring softening point: 96° C.
Gardner colour (in 50% solution toluene): 10+

The crude paraffin used contained 34% by weight of oil and had the following characteristics:

Density at 15° C. _____ 0.867
Viscosity at 90° C. _____ 18.4
ASTM colour _____ 5
Melting point, ° C. _____ 73
Pour point, ° C. _____ 74
Flash point (open vessel—Cleveland), ° C. _____ 268

By way of comparison a commercial paraffin was used having the following characteristics: melting point 54° C.; mean molecular weight: 352 (determined by mass spectrography).

Three aqueous emulsions were prepared: one from pure paraffin, the second from pure paraffin and petroleum resin and the third from crude paraffin and petroleum resin.

The first emulsion comprised 45% by weight of paraffin and 1% by weight of emulsifier (sodium dinaphthylmethane disulphonate). In a micro-disperser, the paraffin was melted and heated to 80° C.; the emulsifier was added while stirring and then water heated to 80° C. was gradually introduced over a period of 40 minutes. The emulsion was allowed to cool.

To prepare the second emulsion there was first prepared a mixture of 85 parts by weight of petroleum resin and 15 parts by weight of pure paraffin.

The emulsion corresponded to the following formulation:

43.2 parts by weight of the mixture of resin and paraffin
5.8 parts by weight of colophony
1 part by weight of potassium
50 parts by weight of water.

In a micro-disperser the mixture of resin and paraffin was heated to 130° C.; the colophony was added; the mixture was allowed to cool to 80° C.; potash dissolved in its weight of water and added; was previously heated to 80° C. was added gradually over a period of 40 minutes; the emulsion was allowed to cool.

The third emulsion was prepared from a mixture of:

30 parts by weight of petroleum resin, and
70 parts by weight of crude paraffin.

The emulsion had the following composition:

500 parts by weight of the resin-paraffin mixture
50 parts by weight of stearin
0.3 part by weight of ammonia
611 parts by weight of softened water.

In a micro-disperser, the mixture of petroleum resin and paraffin was heated to 130° C., after cooling to 80° C. the stearin was added; water heated to 80° C. was introduced gradually over a period of 40 minutes; then the ammonia was added. The mixture was allowed to cool.

The agglomerates treated with these three types of emulsions were subjected to the following tests:

Water absorption and swelling in accordance with the standard AFNOR PN B 51–204.

Bending in accordance with standard PN B 51–208.

Trickling according to the following process: water was caused to trickle, by falling vertically at a constant rate, on a test-piece 10 x 10 cm., inclined at 45° in relation to the horizontal and waxed at the edges. The trickling was continued for 8 hours. The percentage of water absorbed was determined in relation to the weight of the board.

The different treatments were performed as follows: for the internal treatment applied by itself: a mixture was taken defined as percent by weight of the finished board: 10% by weight of urea formol adhesive, 3% emulsified product (respectively, pure paraffin, pure paraffin+petroleum resin, crude paraffin+petroleum resin), for the mixed treatment according to the invetnion:

In the internal treatment: 8% in the dry state of urea-formol adhesive+1% in the dry state of emulsified product.

In the surface treatment: 2% in the dry state of urea-formol adhesive+1% in the dry state of emulsified product.

In the surface treatment: 2% in the dry state of urea-formol adhesive+2% emulsified product.

The following results were obtained:

| Product used | Treatment performed | Water absorption, percent, 24 hr. | Swelling, percent, 24 hr. | Trickling, percent, 8 hr. | Bending, (kg.) |
|---|---|---|---|---|---|
| UF adhesive plus pure paraffin emulsion. | Internal | 53 | 17 | 12 | 350 |
|  | Internal plus surface. | 53 | 20 | 11 | 455 |
| UF adhesive plus resin/pure paraffin emulsion. | Internal | 63 | 17 | 32 | 280 |
|  | Internal plus surface. | 55 | 10 | 8 | 375 |
| UF adhesive plus resin/crude paraffin emulsion. | Internal | 57 | 17 | 14 | 300 |
|  | Internal plus surface. | 51 | 17 | 9 | 375 |

It is apparent that a mixed treatment according to the invention, with an emulsion containing a resin, always improved very appreciably the waterproofing properties of the agglomerates and that on the whole the crude paraffin gave as good results as pure paraffin.

It is obvious that many modifications may be made without departing from the scope of the invention as defined in the appended claims.

What is claimed is:

1. A treating composition which comprises a thermosetting resin adhesive and an aqueous emulsion of a thermoplastic petroleum resin/paraffin mixture.

2. A treating composition as defined in claim 1, wherein said adhesive is a urea-formaldehyde resin containing an ammonium salt hardener.

3. The treating composition of claim 2 wherein the paraffin is crude paraffin.

References Cited

UNITED STATES PATENTS 2,809,948  10/1957  Hunter _____ 260—28.5(B)
2,813,840  11/1957  Salzberg _____ 260—17.2

OTHER REFERENCES

Skeist, Handbook of Adhesives, TP 968 S5, 1962, p. 321 relied on.

ALAN LIEBERMAN, Primary Examiner

S. L. FOX, Assistant Examiner

U.S. Cl. X.R.

260—28.5